Figure 1A:
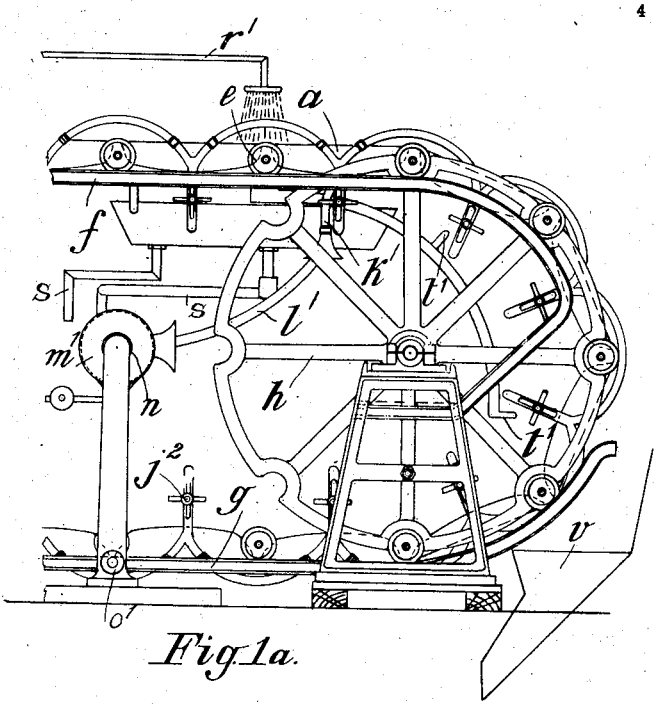

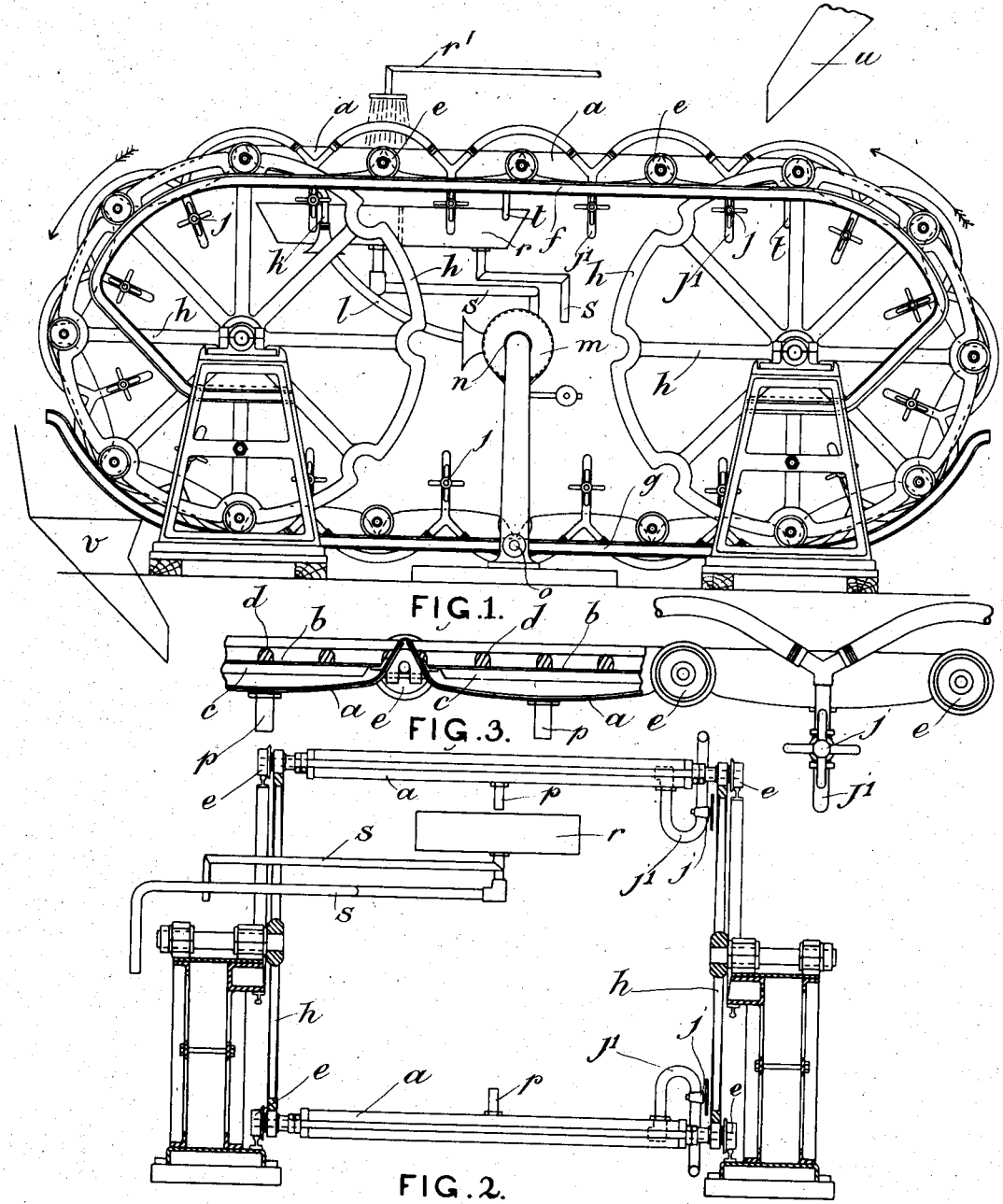

No. 834,233. PATENTED OCT. 23, 1906.
R. K. EVANS.
APPARATUS FOR SEPARATING METALS FROM ORES.
APPLICATION FILED DEC. 29, 1904.

4 SHEETS—SHEET 2.

WITNESSES
W. P. Burke

INVENTOR
Richard Kendall Evans
BY Richardson
ATTYS

No. 834,233. PATENTED OCT. 23, 1906.
R. K. EVANS.
APPARATUS FOR SEPARATING METALS FROM ORES.
APPLICATION FILED DEC. 29, 1904.

4 SHEETS—SHEET 3.

Witnesses

Inventor
Richard K. Evans

Attorneys

No. 834,233. PATENTED OCT. 23, 1906.
R. K. EVANS.
APPARATUS FOR SEPARATING METALS FROM ORES.
APPLICATION FILED DEC. 29, 1904.

4 SHEETS—SHEET 4.

Witnesses
Inventor
Richard K. Evans
BY
ATTORNEYS

UNITED STATES PATENT OFFICE.

RICHARD KENDALL EVANS, OF LONDON, ENGLAND, ASSIGNOR TO THE CYANIDE VACUUM FILTER COMPANY LIMITED, OF LONDON, ENGLAND.

APPARATUS FOR SEPARATING METALS FROM ORES.

No. 834,233.　　　　　Specification of Letters Patent.　　　　　Patented Oct. 23, 1906.

Application filed December 29, 1904. Serial No. 238,809.

*To all whom it may concern:*

Be it known that I, RICHARD KENDALL EVANS, a subject of the King of Great Britain and Ireland, residing at London, England, have invented a new and useful Improved Apparatus for the Separation of Liquids from Solids, particularly applicable to the extraction of metals from their ores, of which the following is a specification.

This invention relates to apparatus for the separation of liquids from solids, and is particularly applicable to the extraction of metals from their ores. By way of illustration I will refer to the treatment of gold slimes as one particular purpose to which my invention can be applied.

The treatment of gold slimes has in the past presented mechanical rather than chemical difficulties. The dissolution of the gold in the slimes by cyanid or other solvent is simple, provided that quick and effective removal of the gold-carrying solvent from the solid residue of the slimes can be effected in a simple manner.

The efforts of those attempting to solve the problem in the past have almost invariably been directed to dealing with the slimes in large bulk, rendering the separation of the solvent solution from the slimes a slow and more or less ineffective process. The introduction of the filter-press was an attempt to reduce the separation of the solution from the slimes from bulk to detail, inasmuch as each filter-cake is a subdivision of the whole bulk and is treated separately. The filter-press, however, is costly and a not altogether satisfactory apparatus for dealing with the question, particularly in view of the fact that the consolidated filter-cake imprisons a certain amount of metal-carrying solvent within it, which is inextractable. Attempts, however, have been made recently to effect the separation of liquids from solids by feeding the material to be treated upon an endless band consisting of wire-gauze carrying a sheet of fabric. This band passes over a vacuum-box, so that the solid matter is delivered dry and can be removed by a scraper or brush, and, finally, the band is cleaned by a washing appliance ready for receiving further quantity of material for treatment. The mechanism in this case is of a somewhat complicated and delicate character, and risk of derangement would appear to be considerable, specially with regard to forming a joint between the endless band and vacuum-box, as special arrangements have been designed to effect this purpose, and, further, the washing of the solid material has not been possible in the same machine as the separation, and distinct machines have been found necessary for the purpose.

My invention substitutes simpler and more substantial mechanism for the endless filtering-band above described and permits of a thorough washing of the solid matter with wash-water or secondary solution in the same machine as effects the original separation and consists in the arrangement of a series of separate filtering elements which are connected together, so as to form or be carried by an endless chain or band substantially in the manner as obtains in well-known conveying apparatus used for the purpose of transporting material.

Each of the filtering elements may consist of a preferably open box or receptacle having a filtering medium supported across it, onto which said filtering medium the material for treatment is delivered from a suitable delivery device. The space below the filtering medium is connected to means for exhausting the atmosphere therefrom, whereby the rate of filtration is effected and the solid matter is relieved of its moisture. This moisture may be withdrawn by the said exhausting means, or, if necessary, a special delivery device may be provided for permitting the delivery of the liquid independent of the gaseous exhaustion. Means are provided for automatically connecting and disconnecting the exhausting device with each filtering device or element at certain stages in the movement of the series. Means are also provided for delivering wash-water to the filtering elements, so that the solid residue is thoroughly freed of any metal-carrying solvent that may be contained therein, the solvent solution being replaced ultimately by wash-water, and thus produce a high extraction of metal with a minimum of residual metal-carrying solvent. If found necessary, means are provided for delivering a charge of air behind the solid residue at the point of discharge or near the same, so as to make it fall clear of the filtering medium, where the solid residue is being discharged from the filtering element.

In order that the invention may be the better understood, I will now proceed to describe the same in relation to the accompanying drawings, reference being had to the letters marked thereon.

Figure 2A:
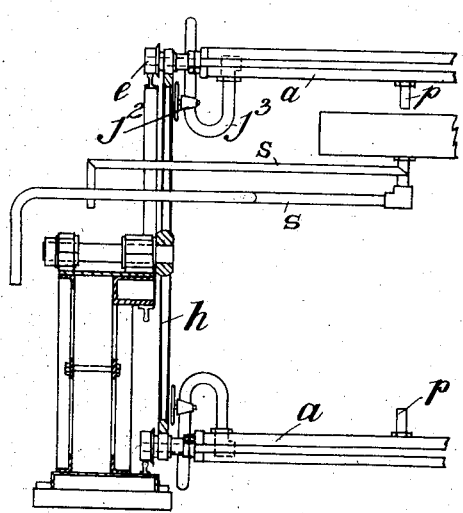
Figure 5:
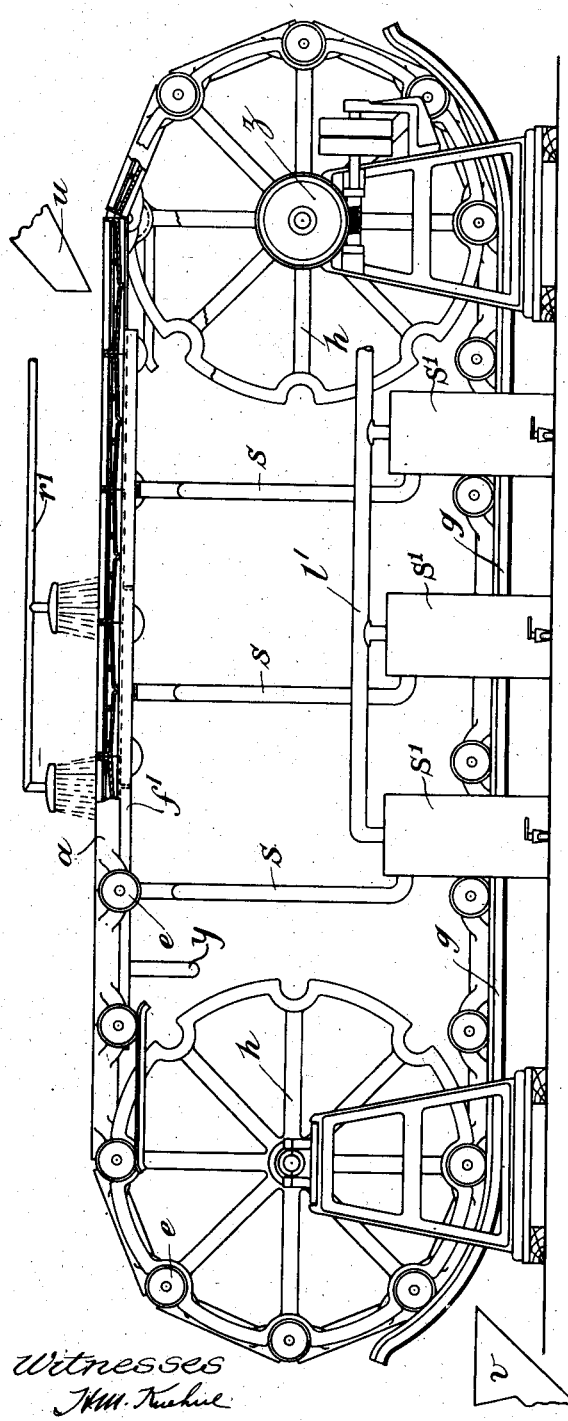
Figure 6:
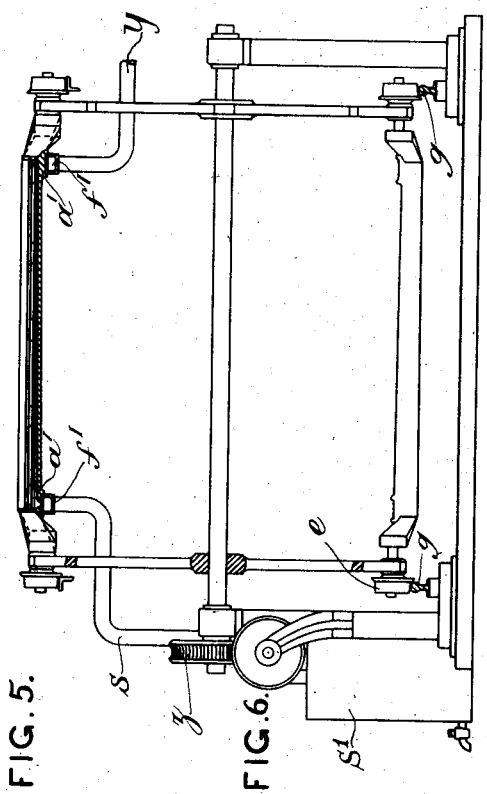
Figure 7:
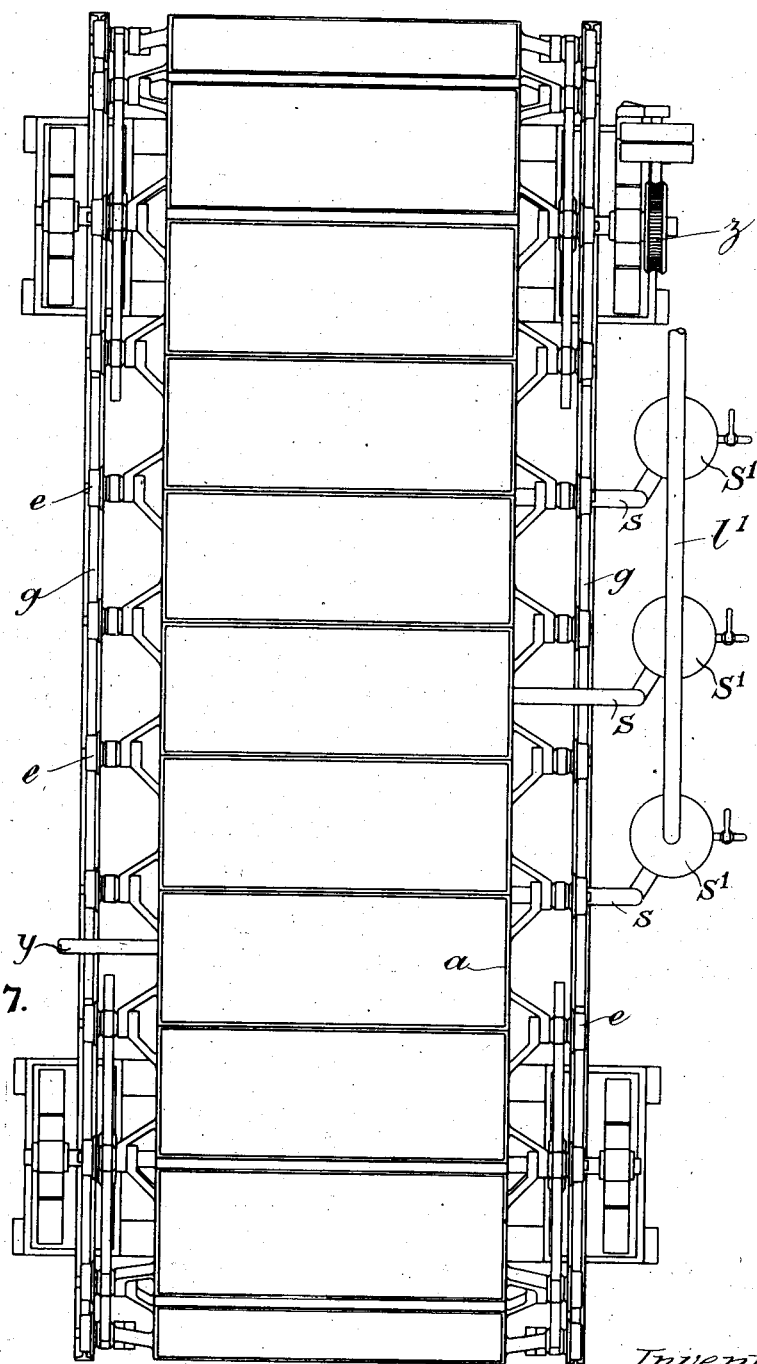

Figure 1 is a side elevation of one form of machine constructed to carry out my invention. Fig. 2 is an end elevation of the same, partially in section. Fig. 3 is an enlarged part-sectional detail view of the filtering elements as shown in Figs. 1 and 2. Figs. 1$^a$ and 2$^a$ are a part sectional elevation and side elevation, respectively, of means for supplying a charge of compressed air to the under side of the filtering medium. Fig. 4 is a sectional detail view of the automatic separate liquid-delivery valve provided at the bottom of each of the filtering elements in the machine shown in Figs. 1, 2, and 3. Fig. 5 is a side elevation of a modified construction in which flexible connecting-pipes are substituted by perforated tubular runners. Fig. 6 is a transverse sectional view through the machine shown in Fig. 5. Fig. 7 is a plan of the machine as shown in Figs. 5 and 6.

Referring now to Figs. 1, 2, 3, and 4, it will be seen that each filtering element consists of a tray $a$, provided with a transverse filtering-diaphragm $b$, supported on bearers $c$ and held in place by grids $d$. Each tray is provided with means, such as rollers $e$, adapted to run upon a support or way $f$ at the upper part and at the lower part upon a support or way $g$. The filtering elements are joined together in a series as an endless band, the filtering elements being guided at the ends of the machine upon the supporting-wheels $h$. Each tray $a$ has an air-pipe $j'$, provided with a cock or valve $j$, which connect with a pipe $k$, common to each element of the series, having at portions of its length the flexible connecting-pieces, which permit of the angular movement of the filtering elements relative to one another when passing round the wheel at each end. The pipe $k$ is connected at one part with a flexible pipe $l$, which is coiled round a spring-drum $m$, provided with communication at its axis of movement $n$ with a pipe $o$, leading therefrom. The object of this arrangement is to permit of the pipe $l$ accommodating itself to the position of its connection with the pipe $k$ when requiring more or less length, according to its distance from the axis $n$ as the pipe $l$ travels round with the endless band of filtering elements. Under each tray $a$, on the lower side thereof, a liquid-discharge pipe $p$ is provided, the exit-orifice of which is controlled by a valve $q$, Fig. 4, opening outward, which said valve closes automatically during the time the exhaustion is taking place, but immediately opens when the exhausting means are cut off and allows the liquid contained in the lower compartment of the filtering element to be discharged into a trough $r$, supported in any suitable manner. The liquid collected in the trough $r$ is led away by the pipes $s$ $s$.

Suitable projections $t$ are supported on the rails or ways $f$ or on any other suitable support, which coact with the cross-handles of the cocks $j$ to turn them on or off at the necessary point in their travel—i. e., when the vacuum has to be turned on or off. When the tray has reached the position under the supply-chute $u$ from which the filtering elements receive their proper charge of material to be treated, the exhausting means are put into communication with the under side of the filter until the said filtering element arrives over the trough $r$, when the vacuum can be cut off and the liquid collected in the lower compartment of the filtering element is allowed to discharge into the trough $r$. The trough $r$ may be divided into sections and spraying means $r'$ adapted to deliver weak solution or wash-water to reduce the amount of residual metal-carrying solvent in the solid residue.

If desired, the liquid can be removed from the under side of the filtering medium by the exhausting means, together with the gaseous matter.

If desired, a similar arrangement of pipe $j'$, $k$ and $l$, and cocks $j$ can be provided in the opposite side of the machine and connected to the filtering elements in a similar manner, and connected to a source of compressed air or other gaseous fluid, and arranged so that a charge of compressed air is delivered to the under side of the filtering medium, so as to assist in forcing the solid residue away from the upper surface of the said medium when the discharge of the solid residue is taking place. This arrangement is shown in Figs. 1$^a$ and 2$^a$ and consists of cock $j^2$ and pipes $j^3$, $k'$, and $l'$, a spring-drum $m'$ and pipe $o'$, connected to the supply of compressed air, and fixed projections $t'$, provided on the machine to coact with the cocks $j^2$ to turn them on or off at the desired points.

In Figs. 5, 6, and 7 I show a modified construction in which the upper way $f'$ is formed tubular and is connected to the exhausting mechanism by the pipe $l'$. The tubular way $f'$ has a slot on its upper side, while the trays $a$ have saddle-shaped bearing-pieces $a'$ on their lower side, which exactly fit the upper surface of the tubular way $f'$. These saddle-pieces $a'$ have a passage at their upper portion, which communicates with the space in the tray immediately under the filtering medium, and in this way the exhausting means are put into communication with the under side of the filter for a certain period during the travel of the trays along the tubular ways $f'$, said period being determined by the length of the slot in the tubular way $f'$. Above the trays spraying means $r'$ are provided for delivering wash-water or weak solution to the trays. On the under side of the tubular way $f'$ one or more pipes $s$ are arranged, which take the liquid passing through the filtering medium at different points in the travel of the trays, so that, for example, a rich solvent may pass down the first pipe, a medium one down the second pipe, and a weak one down the third pipe. The tubular way is subdivided between these said pipes. The other tubular way $f'$ can be connected to the supply-pipe $y$ for air under pressure to assist in removing the solid residue. The slot in this way $f'$ is not shown in Fig. 6, as this slot does not extend to the point where this section is taken, for, of course, the pressure is not applied when the vacuum is on. The period in which the pressure is supplied to the trays is determined by the length of slot in the tubular way $f'$.

In order to simplify the arrangements by which the vacuum is connected to the subdivisions of tubular way and to collect the solutions of various strengths in separate vessels, I may arrange a collecting vessel $s'$ for each subdivision, having an independent discharge-pipe from the tubular way, and I provide a pipe from the exhausting means, which is common to all the vessels, or I may provide two or more cylinders to the vacuum-pumps, each of which draws and delivers a separate and different solution. In this way solutions of various strength can be collected at one and the same time, while only one exhausting device is required. Wheels $e$ are carried at the junction of the trays to each other and are used for supporting the said trays during their passage on the lower rail or way $g$. The other arrangements in this modified construction are substantially the same as that already described. A simple method of operating the machine is by worm and worm-wheel gearing $z$, as shown.

The operation of the machine is as follows: Dealing first with the machine as shown in Figs. 1, 2, and 3, the mixture of the liquid and solid material to be treated is fed at a predetermined rate down the chute $u$ and is delivered into the tray which happens to be immediately under the said chute. The whole machine is operated in the direction of the arrows from any suitable source of power and is moved at a slow rate. As the filtering element thus charged moves away from under the chute the moisture is extracted therefrom through the filtering medium by means of the exhaustion from the pipes $k$, $l$, and $j'$. When the element has reached such a position that the delivery-pipe is over the tray $r$, the cock $j$ comes in contact with the projection $t$ and is revolved about one-fourth revolution, so as to cut off the exhausting means from the under side of the tray. The liquid contained in the said tray now runs out from the self-acting valve $q$, Fig. 4, into the trough $r$ and thence away by the pipe $s$. As the filtering element travels round the wheel $h$ at the left-hand end it delivers its contents into the chute $v$, provided for the purpose, and if air-pressure is used to assist such delivery the cock admitting such air-pressure to the under side of the filter is opened as the filtering element is passing round from the upper ways $f$ to the lower way $g$ and is closed again when the filtering element has traveled sufficiently far to allow it to be fully discharged.

Dealing now with the operation of the machine as illustrated in Figs. 5, 6, and 7, the operation of charging and discharging the trays is precisely similar to those already described; but in this case the movement of the filtering elements along the tubular ways automatically sets up and cuts off the communication of the exhausting means with the filtering elements, and when a gaseous pressure is applied through one of the tubular ways the control of such pressure is automatically effected in the same way—i. e., by means of the slots therein. It will be seen that this construction entirely overcomes the disadvantages involved in the use of flexible pipes and connection and the control-valve connected therewith.

Having now particularly described and ascertained the nature of my said invention and in what manner the same is to be performed, I declare that what I claim is—

1. An apparatus for separating liquid from solid matter consisting of a series of independent filtering-trays each having an independent and separate filtering medium fixedly attached thereto and an inclosed space on the liquid-delivery side of the said medium; means for continuously supplying the material to be treated to the filtering-surface of the said trays consecutively the said means and the filtering-trays being adapted to move relatively to one another, means connected with the said inclosed space for exhausting the matter passing through the filtering medium, means for controlling the period of said exhaustion and means by which the filtering-trays are discharged of the solid residue.

2. An apparatus for separating liquid from solid matter consisting of a series of independent filtering-trays each having an independent and separate filtering medium fixedly attached thereto and an inclosed space on the liquid-delivery side of said medium; means for continuously supplying the material to be treated to the said trays consecutively the said means and filtering-trays being adapted to move relatively to one another, means for exhausting the atmosphere from the liquid-delivery side of the filtering medium, means for automatically controlling the period of said exhaustion, means for discharging the liquid passed through the filtering medium and means by which the filtering-trays are discharged of the said residue.

3. In an apparatus for the continuous and automatic separation of liquid from solid matter, a series of filtering-trays each consisting of a vacuum-box, an independent and separate filtering medium fixedly attached thereto and a receptacle for receiving the material to be treated in combination with a feeding device and means for giving each filtering-tray and the feeding device a movement relative to one another.

4. An apparatus for separating liquid from solid matter consisting of a series of filtering-trays, each tray having an independent and separate filtering medium fixedly attached thereto and an inclosed space on the liquid-delivery side of said medium, the said trays being connected together as a movable endless band, tubular ways adapted to allow the trays to slide thereon and to form a connection between exhausting means and the liquid-delivery side of the filtering medium, means for maintaining and carrying the band in its extended form, a feeding device for delivering the materials to be treated to the filtering-trays and means for receiving the delivery of the solid residue.

5. An apparatus for separating liquid from solid matter consisting of a series of filtering-trays each having an independent and separate filtering medium fixedly attached thereto and an inclosed space on the liquid-delivery side of said medium, means for continuously supplying the material to be treated to the filtering medium of the said trays consecutively, means for supplying liquid to the material deposited on the filtering medium, and means for withdrawing the liquid which has passed through the filtering medium, and means for producing relative movement between each filtering-tray and the feeding and water-spraying devices.

6. An apparatus for separating liquid from solid matter consisting of a series of filtering-trays each having an independent and separate filtering medium fixedly attached thereto and an inclosed space on the liquid-delivery side of the said medium, means for continuously supplying the material to be treated to the filtering medium of the said trays consecutively, means for supplying liquid to the material deposited on the filtering medium, a series of devices for withdrawing the liquid which has passed through the filtering medium by which solutions of different character can be separately obtained and means for producing relative movement between each filtering-tray and the feeding and water-spraying devices.

7. An apparatus for separating liquid from solid matter consisting of a series of independent filtering-trays each having an independent and separate filtering medium fixedly attached thereto and an inclosed space on the liquid-delivery side of the said medium; means for continuously supplying the material to be treated to the filtering-surface of the said trays consecutively the said means and the filtering-trays being adapted to move relatively to one another, means connected with the said inclosed space for exhausting the matter passing through the filtering medium, means for controlling the period of said exhaustion, means for supplying a compressed gaseous charge under the layer of solid material to disengage it from the filtering medium, means for controlling the supply of said gaseous charge and means by which the filtering-trays are discharged of the solid residue.

In testimony whereof I have signed my name to this specification in the presence of two subscribing witnesses.

RICHARD KENDALL EVANS.

Witnesses:
PERCY J. OGLE,
JOHN PHILLIPS.